United States Patent
Hoss et al.

(10) Patent No.: US 7,250,217 B2
(45) Date of Patent: Jul. 31, 2007

(54) FILM FOR COMPOSITE SECURITY DISKS WITH SELF-ADHESIVENESS

(75) Inventors: Manfred Hoss, Troisdorf (DE); Bernhard Koll, Sankt Augustin (DE); Holger Stenzel, Hennef (DE)

(73) Assignee: Kuraray Europe GmbH, Frankfurt am Main (DE)

( * ) Notice: Subject to any disclaimer, the term of this patent is extended or adjusted under 35 U.S.C. 154(b) by 327 days.

(21) Appl. No.: 10/499,121

(22) PCT Filed: Dec. 17, 2002

(86) PCT No.: PCT/DE02/04614

§ 371 (c)(1),
(2), (4) Date: Dec. 16, 2004

(87) PCT Pub. No.: WO03/051974

PCT Pub. Date: Jun. 26, 2003

(65) Prior Publication Data

US 2005/0079363 A1    Apr. 14, 2005

(30) Foreign Application Priority Data

Dec. 18, 2001    (DE) ................................ 101 62 338

(51) Int. Cl.
*B32B 17/10* (2006.01)
*C08K 5/103* (2006.01)
*B32B 27/08* (2006.01)
*C08J 5/18* (2006.01)

(52) U.S. Cl. ........................ 428/437; 428/436; 524/311

(58) Field of Classification Search ................. 428/437, 428/436; 524/311
See application file for complete search history.

(56) References Cited

U.S. PATENT DOCUMENTS 4,537,828 A    8/1985    Gomez

FOREIGN PATENT DOCUMENTS

DE    19938159    2/2001
EP    0133848    3/1985

*Primary Examiner*—D. S. Nakarani
(74) *Attorney, Agent, or Firm*—Millen, White, Zelano & Branigan, P.C.

(57) ABSTRACT

Plasticized films suitable as an intermediate layer in laminated safety glass and based on partially acetalized polyvinyl alcohols, in particular PVB, have not only the required excellent adhesion to glass but also undesired self-adhesion (susceptibility to blocking).

Amounts of from 0.001 to 0.1% by weight of a pentaerythritol ester are proposed for use as an additive which reduces self-adhesion. This additive does not alter the adhesion of the film to glass.

The invention is used for producing films for the production of laminated safety glass. The need to cool the films for stacking or wind-up is substantially eliminated.

13 Claims, No Drawings

FILM FOR COMPOSITE SECURITY DISKS WITH SELF-ADHESIVENESS

TECHNICAL FIELD

Laminated safety panes, composed of two glass panes and of an adhesive film composed of plasticized partially acetalized polyvinyl alcohols, preferably of polyvinyl butyral (PVB), and bonding the glass panes, are in particular used as windshield panes in motor vehicles, and, where appropriate, one glass pane here may have been replaced by a plastics sheet, mainly composed of an amorphous polyamide, or of transparent PMMA, polycarbonate or polyester. These types of silicate glass/silicate glass or silicate glass/plastics composites are also used in the construction sector, e.g. as window panes or as partition walls, and, depending on how the composites are used use is also made here, where appropriate, of multiple composites, i.e. composites composed of more than two load-bearing layers, e.g. in the form of bulletproof glass.

Whereas laminated safety panes for the construction sector are generally intended to have maximum adhesion between glass and adhesive film, a defined level of adhesion, not too high, is desirable on laminated safety panes for motor vehicles. Laminated safety glass is generally composed of two glass panes and of an adhesive film bonding the glass panes.

The adhesive films for producing laminated safety panes are generally extruded and wound up to give large rolls after shaping in slot dies. The adhesive films—for which the abbreviated term PVB films is also used below—have good adhesion not only to glass but also to the adjacent wound layer on the rolls. This property is called susceptibility to blocking and makes the handling of the films more difficult, in particular during wind-up or unwinding. Plasticized PVB is marketed not only in rolls but also in trimmed stacks (known as blanks), in which susceptibility to blocking is likewise undesirable.

Where the term polyvinyl butyral (PVB) is used in this application, it is intended to include those polymers whose application-related properties are similar to those of (plasticized) polyvinyl butyral. Among these are, by way of example, ethylene-vinyl acetate and certain other ethylene copolymers. Properties regarded as relevant here are in particular surface adhesion, softness, and elastomeric properties at room temperature.

PRIOR ART

DE 17 04 568 A1 discloses a process for producing plasticized, matt-surface polyvinyl butyral films by reeling the PVB films previously provided with the desired water content together with an insert acting as release layer and composed of a, where appropriate, matt, polyolefin film, and packaging the resultant rolls so as to exclude air and moisture. However, the use of this "separator" film is rather inconvenient.

DE 19 27 936 A1 discloses a process for producing low-tack plasticized polyvinyl butyral films which, after washing, give films with two roughened surfaces. For this, the films are powdered while still warm after extrusion or, where appropriate, after warming their surface, with substances which are inert with respect to the films and water-soluble and non-hygroscopic, and preferably crystalline and colorless, these being anchored onto the films by applying warmth and pressure. However, this process is very complicated.

There are also numerous inventions which use specific surface embossments or some other method of creating particular surface structures, in an attempt to bring about temporary reduction in the adhesion of the plasticized polyvinyl butyral films (e.g. EP 0 710 545 A1, EP 0 185 863 B1). However, the resultant effect is generally insufficient to allow the wound film to be transported at usual ambient temperatures. Although the nature of the surface has been optimized, the rolls of PVB films are nevertheless almost always delivered with separator films, or in the form of what is known as a chilled film. For this, the film is cooled to a temperature of from 4 to 10° C. for wind-up. Continuous chilling has to be maintained at a temperature below 10° C. during transport of the finished wound-up film, until further processing.

Attempts have also been disclosed to reduce the susceptibility to blocking of PVB films via modification of the PVB resin, or of the plasticizers, or via addition of substances which reduce adhesion (U.S. Pat. No. 4,999,078 A1, EP 0 067 022 B2). However, a disadvantage of these processes is generally that the adhesion of the film to the glass during subsequent lamination is likewise affected, or their action is insufficient to avoid the need for complicated cooling. Another disadvantage of these processes is that modified PVB resins and plasticizers have only very limited commercial availability. These alternatives have not yet been able to achieve acceptance in the market.

OBJECT

It is an object of the present invention to provide a plasticized film suitable as an intermediate layer in laminated safety glass and composed of partially acetalized polyvinyl alcohols, and also to provide laminated safety glass with this film which is suitable as an intermediate layer in laminated safety glass, and which does not have the disadvantages described above.

SUMMARY OF THE INVENTION

The core of the present invention is the use of certain pentaerythritol esters to inhibit adhesion of the film to itself.

Surprisingly, it has been found that certain pentaerythritol esters are suitable, even at extremely low concentrations, for bringing about a considerable reduction in blocking in plasticized polyvinyl butyral films, without any impairment of the adhesion to the glass after lamination. All of the other properties of the film also remain completely unchanged, e.g. the mechanical properties of the film or the high transparency.

Pentaerythritol esters which have proven to be particularly suitable additives for the present invention are pentaerythritol tetrastearates and pentaerythritol (mono-, di- or tri-)adipatostearates, the latter in particular also in the form of an isomer mixture.

The pentaerythritol esters used according to the invention are esters of pentaerythritol, which is a tetrahydric alcohol, and one or more of the alcohol groups here may have substitution by mono- or polybasic carboxylic acids. The acids used for esterification are preferably relatively long-chain acids, in particular having from 12 to 21 carbon atoms. Preferred pentaerythritol esters are given in claims 2 to 5.

A detectable antiblocking effect is exhibited even by amounts starting at from 0.002 to 0.005% by weight of the preferred pentaerythritol esters, i.e. from 20-50 ppm. Their amounts used are preferably from 0.01 to 0.1% by weight, based in each case on the weight of the film. If use is made of amounts larger than 1% by weight, there is the risk of haze in the film, and the use of the films with higher content of pentaerythritol ester as intermediate layer in laminated safety glass should therefore generally be avoided.

A method which has proven particularly advantageous is to begin by dispersing the added amount of pentaerythritol esters in the plasticizer used, or to dissolve it in the plasticizer, if the esters are soluble therein. The films are then produced in a manner known per se, e.g. via extrusion by means of a slot die in accordance with EP 0 185 863 B1. If the pentaerythritol esters are insoluble, they are melted in the extruder during the extrusion process and homogeneously distributed within the melt.

Suitable plasticizers are firstly any of the plasticizers known in the prior art, in particular esters of polybasic acids, of polyhydric alcohols, or of oligoether glycols, e.g. adipic esters, sebacic esters, or phthalic esters, in particular di-n-hexyl adipate, dibutyl sebacate, dioctyl phthalate, esters of di-, tri- or tetraglycols with linear or branched aliphatic carboxylic acids, and mixtures of these esters. Standard plasticizers are preferably esters of aliphatic diols with long-chain aliphatic carboxylic acids, in particular esters of triethylene glycol with aliphatic $C_6$-$C_{10}$ carboxylic acids, such as 2-ethylbutyric acid or n-heptanoic acid. Particular preference is given to one or more plasticizers from the group consisting of di-n-hexyl adipate (DHA), dibutyl sebacate (DBS), dioctyl phthalate (DOP), esters of di-, tri- or tetraglycols with linear or branched aliphatic carboxylic acids, in particular triethylene glycol bis(2-ethylbutyrate) (3GH), triethylene glycol bis(n-heptanoate) (3G7), triethylene glycol bis(2-ethylhexanoate) (3G8), tetraethylene glycol bis-(n-heptanoate) (4G7).

However, the pentaerythritol esters used according to the invention also permit the use of specialized plasticizers which, for example, bring about better sound-deadening in the films, and reference should be made to DE 199 38 159 A1, the entire content of which is incorporated herein by way of reference. Among these is in particular the group of plasticizers consisting of polyalkylene glycols of the general formula HO—(R—O)$_n$—H, where R=alkylene and n>5, block copolymers composed of ethylene glycol and propylene glycol and having the general formula HO—(CH$_2$—CH$_2$—O)$_n$—(CH$_2$—CH(CH$_3$)—O)$_m$—H, where n>2, m>3 and (n+m)<25, derivatives of block copolymers composed of ethylene glycol and propylene glycol and having the general formula R$_1$O—(CH$_2$—CH$_2$—O)$_n$—(CH$_2$—CH(CH$_3$)—O)$_m$—H, or HO—(CH$_2$—CH$_2$—O)$_n$—(CH$_2$—CH—(CH$_3$)—O)$_m$—R$_1$, where n>2, m>3 and (n+m)<25, and R$_1$ is an organic radical, derivatives of polyalkylene glycols of the general formula R$_1$—O—(R$_2$—O)$_n$—H, where R$_2$=alkylene and n≧2, where the hydrogen of one of the two terminal hydroxy groups of the polyalkylene glycol has been replaced by an organic radical R$_1$, derivatives of polyalkylene glycols of the general formula R$_1$—O—(R$_2$—O)$_n$—R$_3$, where R$_2$=alkylene and n>5, where the hydrogen in the terminal hydroxy groups of the polyalkylene glycol has been replaced by an organic radical R$_1$ and, respectively, R$_3$.

These specialized plasticizers are preferably used in combination with one or more standard plasticizers.

Without the use of the inventive pentaerythritol esters, these specialized plasticizers generally give films with particularly high susceptibility to blocking, with the result that their handling during subsequent lamination, and in particular during wind-up and unwind, is particularly problematic. The pentaerythritol esters used according to the invention act synergistically to reduce the level of blocking properties of these films which are based on partially acetalized polyvinyl alcohols and are inherently particularly susceptible to blocking, and their use is therefore particularly advisable in films with these plasticizers.

The plasticized partially acetalized polyvinyl alcohol resin preferably comprises from 25 to 45 parts by weight, particularly preferably from 30 to 40 parts by weight, of plasticizer, based on 100 parts by weight of resin. It is known that relatively high contents of plasticizers increase the self-adhesion of the films. However, when use is made of the pentaerythritol esters used according to the invention it is possible to use even relatively large amounts of plasticizer which, without this addition, would exceed the processable limit.

The partially acetalized polyvinyl alcohols are prepared in a known manner via acetalization of hydrolyzed polyvinyl esters. Examples of aldehydes which may be used are formaldehyde, acetaldehyde, propionaldehyde, butyraldehyde and the like, preferably butyraldehyde. The preferred polyvinyl butyral resin contains from 10 to 25% by weight, preferably from 17 to 23% by weight and particularly preferably from 19 to 21% by weight, of vinyl alcohol residues. Where appropriate, the polyvinyl butyral also contains from 0 to 20% by weight, preferably from 0.5 to 2.5% by weight, of acetate residues.

The water content of the films is preferably adjusted to 0.15-0.8% by weight, in particular to 0.2-0.5% by weight.

A substantial advantage of the pentaerythritol esters used according to the invention is firstly a considerable reduction in the self-adhesion of the plasticized film suitable as an intermediate layer in laminated safety glass and based on partially acetalized polyvinyl alcohols, and secondly no impairment of the adhesion of the film to glass.

To quantify self-adhesion (blocking force), what is known as a T-peel strength test is known from EP 0 067 022 B2: in this, two strips of the film to be tested, dimensions 3 cm×10 cm, are mutually superposed under a load of 60 N at a temperature of 20° C. for 48 h. The strips are then pulled apart at a defined velocity of 500 mm/min at an angle of 2×90° while measuring the peel force. Reference is hereby made to the description of the T-peel strength test in EP 0 067 022 B2 in respect of further details.

This T-peel strength test has good suitability for determining the minimum amounts needed for effectiveness of the pentaerythritol esters used according to the invention. The concentration used of the pentaerythritol esters is preferably such as to bring about a reduction of at least 20%, preferably of at least 50%, and very particularly preferably of at least 90%, in the peel force.

To assess the adhesion of a PVB film to mineral glass, what is known as a compression shear test is carried out in accordance with DE 197 56 274 A1. To produce the test specimens, the adhesive PVB film to be tested is placed between two flat 300 mm×300 mm silicate glass panes of thickness 4 mm, deaerated using calender rolls in an oven for producing precomposites, to give a glass precomposite, and then subjected to a pressure of 12 bar in an autoclave at a temperature of 140° C. for a period of 30 min, to give flat laminated safety glass. Ten specimens of dimensions 25.4 mm×25.4 mm are cut from the resultant laminated safety glass. These are clamped at an angle of 45° into a two-part test apparatus illustrated diagrammatically in FIG. 1 of DE 197 56 274 A1. The upper half is subjected to a constantly increasing force directed precisely in a vertically downward direction until shear leads to separation within the test specimen, i.e. within the laminated safety glass panes to be tested.

The test parameters are as follows:

TABLE 1

| Test specimen: | square, 25.4 mm × 25.4 mm |
|---|---|
| Orientation: | lower pane in each case with the air side or fire side toward the film (air/air), or upper and lower pane in each case with the tin side toward the film (bath/bath) |
| Storage prior to test: | 4 h under standard conditions of temperature and humidity at 23° C./50% relative humidity |
| Advance: | 2.5 mm/min |
| Number of specimens: | 10 |
| Evaluation: | maximum force needed to shear the film from the glass. The force is related to the specimen area (in N/mm² or psi) |

The value used for each example is the arithmetic mean, from ten identical test specimens, of the force exerted when shear-separation occurs. When reference is made in the examples below or in the claims to the mean compression shear test value, that is this mean from 10 measurements. Reference is made to DE 197 56 274 A1 in respect of further details.

METHODS OF WORKING THE INVENTION AND COMPARATIVE EXAMPLES

Comparative Example 1 and Examples 2 to 4

26 parts by weight of triethylene glycol bis(2-heptanoate) (3G7) as plasticizer were added together with 0.15 part by weight of the UV absorber Tinuvin® P (producer: Ciba) to 74 parts by weight of a polyvinyl butyral resin with a vinyl alcohol residue content of 20.5% by weight and a vinyl acetate residue content of 0.8% by weight. The amounts stated in the table below of pentaerythritol tetrastearate, the product Glycolube® P from Lonza, were dispersed in advance in the plasticizer. The mixture was extruded in a twin-screw extruder with slot die at about 200° C. melt temperature, to give a transparent film of thickness 0.38 mm with a roughened surface, $R_z$=18 µm. For all of the specimens, the moisture content of each of the films was about 0.45% by weight.

TABLE 2

| Formulation | Comparative Example 1 | Example 2 | Example 3 | Example 4 |
|---|---|---|---|---|
| Polyvinyl butyral resin [pts. by weight] | 74.0 | 74.0 | 74.0 | 74.0 |
| Plasticizer 3G7 [pts. by weight] | 26.0 | 26.0 | 26.0 | 26.0 |
| UV absorber [pts. by weight] | 0.15 | 0.15 | 0.15 | 0.15 |
| Pentaerythritol tetrastearate [% by weight] | 0 | 0.001% | 0.0025% | 0.005% |
| Compression shear test air/air [N/mm²] | 27.7 | 28.1 | 30.1 | 29.7 |
| Tin/tin [N/mm²] | 17.5 | 18.3 | 17.9 | 17.4 |
| Blocking force (in accordance with EP 0 067 022 B2) [N/30 mm] | 25 | 24 | 17 | 8 |

It is seen that the addition of as little as about 0.0025% by weight=25 ppm of pentaerythritol tetrastearate as pentaerythritol ester brings about a significant reduction in the blocking force, while the glass adhesion (compression shear test) remains unchanged within the bounds of accuracy of measurement. Addition of as little as 0.005% by weight=50 ppm of pentaerythritol tetrastearate lowers the blocking force by almost 70%, to 8 [N/30 mm].

Comparative Example 5, Examples 6 to 9

The procedure was the same as in Example 1, but with larger gradations of pentaerythritol tetrastearate (Glycolube® P) in accordance with Table 3 below. The polyvinyl butyral resin used comprised a grade whose vinyl alcohol residue content was 20.5% by weight and whose vinyl acetate residue content was 0.8% by weight. The use of only 0.01% by weight of pentaerythritol ester in the form of pentaerythritol tetrastearate reduced the blocking force to 1.2 [N/30 mm], i.e. a reduction of about 95%. An increase in the proportion of pentaerythritol tetrastearate to 0.02%=200 ppm led to a further lowering of the blocking force to less than 1.5% of the initial value, while a further increase in the proportion of pentaerythritol tetrastearate led only to very small further reductions in the blocking force.

TABLE 3

| Formulation | Comparative Example 5 | Example 6 | Example 7 | Example 8 | Example 9 |
|---|---|---|---|---|---|
| Polyvinyl butyral resin [pts. by weight] | 74.0 | 74.0 | 74.0 | 74.0 | 74.0 |
| Plasticizer 3G7 [pts. by weight] | 26.0 | 26.0 | 26.0 | 26.0 | 26.0 |
| UV absorber [pts. by weight] | 0.15 | 0.15 | 0.15 | 0.15 | 0.15 |
| Pentaerythritol tetrastearate [% by weight] | 0 | 0.01% | 0.02% | 0.03% | 0.04% |
| Compression shear test air/air [N/mm²] | 27.7 | 28.7 | 27.4 | 24.5 | 22.5 |
| Tin/tin [N/mm²] | 17.5 | 19.1 | 19.3 | 17.7 | 15.2 |
| Blocking force (in accordance with EP 0 067 022 B2) [N/30 mm] | 25 | 1.2 | 0.30 | 0.22 | 0.20 |

The effect of these amounts of pentaerythritol tetrastearate is so excellent that cooling of the films can be completely omitted up to temperatures of from about 30 to 40° C. This leads to enormous savings during the production, transport, and use of the inventive films.

(Comparative) Examples 10 to 12

The procedure was as in Example 1, but using a pentaerythritol adipatostearate, Advalube® E-2100 from Rohm & Haas, in accordance with Table 4 below. Advalube® E-2100 is an isomer mixture composed of pentaerythritol monoadipatostearate, pentaerythritol diadipatostearate and pentaerythritol triadipatostearate, i.e. a mixture of mono- to trisubstituted pentaerythritol. The use of only 0.04% by weight of this type of pentaerythritol ester reduced the blocking force to 1.0 [N/30 mm], the reduction therefore being about 95%. An increase in the proportion of pentaerythritol (mono-, di-, tri-)adipatostearate to 0.1%=1000 ppm further lowered the blocking force to less than 1% of the initial value.

TABLE 4

| Formulation | Comparative Example 10 | Example 11 | Example 12 |
|---|---|---|---|
| Polyvinyl butyral resin [pts. by weight] | 74.0 | 74.0 | 74.0 |
| Plasticizer 3G7 [pts. by weight] | 26.0 | 26.0 | 26.0 |
| UV absorber [pts. by weight] | 0.15 | 0.15 | 0.15 |
| Pentaerythritol adipatostearate (isomer mixture) [% by weight] | 0 | 0.04% | 0.10% |
| Compression shear test air/air [N/mm$^2$] | 27.7 | 24.1 | 23.9 |
| Tin/tin [N/mm$^2$] | 17.5 | 16.1 | 14.9 |
| Blocking force (in accordance with EP 0 067 022 B2) [N/30 mm] | 25 | 1.0 | 0.2 |

Comparative Example 13, Example 14

The procedure was as in Example 1, but using, as plasticizer, an increased amount of a mixture composed of di-n-hexyl adipate (DHA) and Marlophen® NP 6 from Condea, a bilaterally substituted PEG with polyethylene glycol content with a DP of 6 and an isononylphenol content at one of the two hydroxy-terminated ends. This mixing specification for the film gives films with greatly improved acoustic properties, as described in DE 199 38 159 A1. Without the inventive addition of pentaerythritol tetrastearate, the result is a blocking force of 11 [N/30 mm]—small in absolute terms. However, because the plasticizer and mixing specification used make the film substantially softer than a standard film, even this level of self-adhesion greatly impairs handling of the film. Addition of 0.04% by weight of pentaerythritol tetrastearate lowers this value to 0.12 [N/30 mm], or about 1% of the initial value, substantially improving the handling properties of the film.

TABLE 6

| Formulation | Comparative Example 13 | Example 14 |
|---|---|---|
| Polyvinyl butyral resin [pts. by weight] | 66.0 | 66.0 |
| Plasticizer DHA [pts. by weight] | 22.0 | 22.0 |
| Plasticizer NP 6 [pts. by weight] | 12.0 | 12.0 |
| UV absorber [pts. by weight] | 0.15 | 0.15 |
| Pentaerythritol tetrastearate [% by weight] | 0 | 0.04% |
| Compression shear test air/air [N/mm$^2$] | 20.5 | 20.5 |
| Tin/tin [N/mm$^2$] | 10.5 | 11.5 |
| Blocking force (in accordance with EP 0 067 022 B2) [N/30 mm] | 10.9 | 0.12 |

The invention claimed is:

1. A plasticized film suitable as an intermediate layer in laminated safety glass comprising partially acetalized polyvinyl alcohol and, additionally, one or more pentaerythritol esters of the following formula:

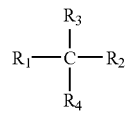

where $R_1$, $R_2$ and $R_3=$

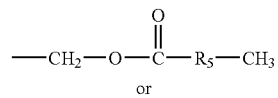

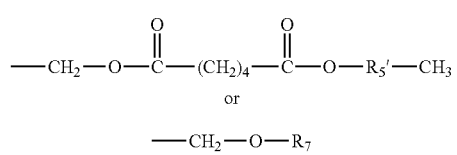

where $R_5$ and $R_{5'}=$saturated or unsaturated hydrocarbon having from 1 to 26 carbon atoms, and $R_7=$H, alkyl group or aryl group, and $R_4=$

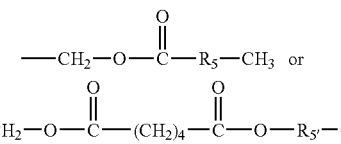

where $R_5$ and $R_{5'}=$saturated or unsaturated hydrocarbon having from 1 to 26 carbon atoms.

2. The plasticized film as claimed in claim 1, wherein the one or more pentaerythritol esters are of the following formula:

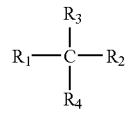

where $R_1$, $R_2$ and $R_3=$

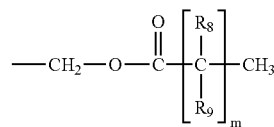

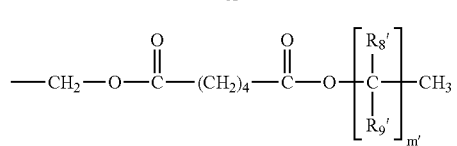

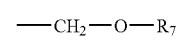

where in each case $R_7$, $R_8$, $R_{8'}$, $R_9$ and $R_{9'}=$H, alkyl group or aryl group, and m and m'=from 1 -26 and $R_4=$

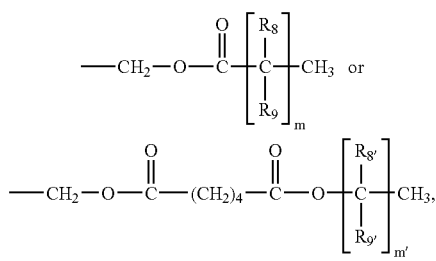

where in each case $R_8$, $R_{8'}$, $R_9$ and $R_{9'}$=H, alkyl group or aryl group, and m and m'=from 1 -26.

3. The plasticized film as claimed in claim 2, wherein the one or more pentaerythritol esters comprise esters of the formula

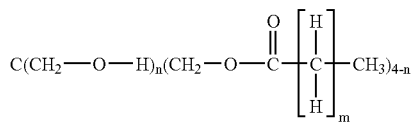

where n=from 0 to 2
and m=from 11 to 20

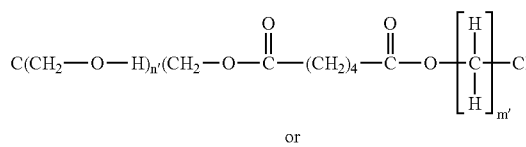

where n'=from 1 to 3
m'=from 11 to 20.

4. The plasticized film as claimed in claim 3, wherein the one or more pentaerythritol esters comprise a pentaerythritol tetrastearate.

5. The plasticized film as claimed in claim 4, wherein the one or more pentaerythritol esters comprise a pentaerythritol (mono, di- or tri-) adipatostearate of the formula:

(V)

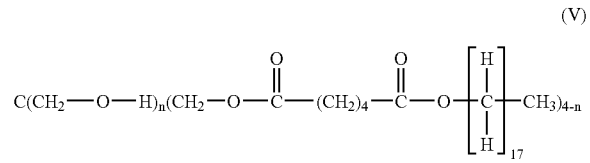

where n =1,2 or 3.

6. The plasticized film as claimed in claim 1, wherein the one or more pentaerythritol esters are provided in a total amount of more than 0.002% by weight, based on the total mixture for the film.

7. The plasticized film as claimed in claim 1, wherein the one or more pentaerythritol esters are dispersed or dissolved homogeneously in the film.

8. The plasticized film as claimed in claim 1, comprising one or more plasticizers from the group consisting of
adipic esters,
sebacic esters,
phthalic esters, and
esters of di-, tri- or tetraglycols with linear or branched aliphatic carboxylic acids.

9. The plasticized film as claimed in claim 1, comprising one or more plasticizers from the group consisting of
polyalkylene glycols of the formula HO—(R—O)$_n$—H, where R=alkylene and n>5,
block copolymers composed of ethylene glycol and propylene glycol and having the formula HO—(CH$_2$—CH$_2$—O)$_n$—(CH$_2$—CH(CH$_3$)—O)$_m$—H, where n>2, m>3 and (n+m)<25,
derivatives of block copolymers composed of ethylene glycol and propylene glycol and having the formula

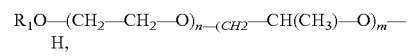

or

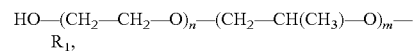

where n>2, m>3 and (n+m)<25, and $R_1$ is an organic radical,
derivatives of polyalkylene glycols of the formula $R_1$—O—($R_2$—O)$_n$—H, where $R_2$=alkylene and n≧2, where the hydrogen of one of the two terminal hydroxy groups of the polyalkylene glycol has been replaced by an organic radical $R_1$, and
derivatives of polyalkylene glycols of the formula $R_1$—O—($R_2$—O)$_n$—$R_3$, where $R_2$=alkylene and n>5, where the hydrogen in the terminal hydroxy groups of the polyalkylene glycol has been replaced by an organic radical $R_1$ and, respectively, $R_3$.

10. A laminated safety glass with at least one glass pane and one film adjoining this glass pane wherein the film is a plasticized film as claimed in claim 1.

11. The plasticized film as claimed in claim 1, wherein the one or more pentaerythritol esters are provided in a total amount of from 0.01 to 0.1% by weight, based on the total mixture for the film.

12. The plasticized film as claimed in claim 1, comprising one or more plasticizers from the group consisting of triethylene glycol bis(2-ethylbutyrate) (3GH), triethylene glycol bis(n-heptanoate) (3G7), triethylene glycol bis(2-ethylhexanoate) (3 G$_8$), and tetraethylene glycol bis(n-heptanoate) (4G7).

13. A method for transport and/or storage of a film as claimed in claim 1, wound directly without interlay to give a wound roll, wherein the wound roll undergoes a rise in temperature to at least 20° C., at least for a period.

* * * * *

UNITED STATES PATENT AND TRADEMARK OFFICE
CERTIFICATE OF CORRECTION

PATENT NO. : 7,250,217 B2
APPLICATION NO. : 10/499121
DATED : July 31, 2007
INVENTOR(S) : Manfred Hoss et al.

It is certified that error appears in the above-identified patent and that said Letters Patent is hereby corrected as shown below:

Column 8, line 24, reads "$R_{5'}$=saturated" should read -- $R_{5'}$ = saturated --
Column 8, line 25, reads "$R_7$=H," should read -- $R_7$ = H, --
Column 8, line 27, reads "$R_4$=" should read -- $R_4$ = --
Column 8, line 38, reads "$R_{5'}$=saturated" should read -- $R_{5'}$ = saturated --
Column 8, line 49, reads "$R_3$=" should read -- $R_3$ = --
Column 8, line 66, reads "$R_{9'}$=H," should read -- $R_{9'}$ = H, --
Column 8, line 67, reads "m'=from" should read -- m' = from --
Column 9, line 1, reads "$R_4$=" should read -- $R_4$ = --
Column 9, line 16, reads "$R_{9'}$=H," should read -- $R_{9'}$ = H, --
Column 9, line 17, reads "m'=from" should read -- m' = from --
Column 9, line 17, reads "1-26." should read -- 1 – 26. --
Column 9, line 29, reads "n=from" should read -- n = from --
Column 9, line 30, reads "m=from" should read -- m = from --
Column 9, line 40, reads "n'=from" should read -- n' = from --
Column 9, line 41, reads "m'=from" should read -- m' = from --
Column 9, line 58, reads "n =1,2 or" should read -- n = 1, 2 or --
Column 10, line 16, reads "R=alkylene and n>5." should read -- R = alkylene and n > 5. --
Column 10, line 19, reads "n>2," should read -- n > 2, --
Column 10, line 20, reads "m>3 and (n+m)<25," should read -- m > 3 and (n+m) < 25, --
Column 10, line 25, reads "...($CH_2$-$CH_2$-O)$_{n-(CH2}$-CH($CH_3$)..." should read -- ...($CH_2$-$CH_2$-O)$_n$-($CH_2$-CH($CH_3$))..." --
Column 10, line 32, reads "n>2, m>3 and (n+m)<25," should read -- n > 2, m > 3 and (n+m) < 25, --
Column 10, line 34, reads "$R_2$=alkylene and n≥2," should read -- $R_2$ = alkylene and n ≥ 2, --
Column 10, line 39, reads "$R_2$=alkylene and n>5," should read -- $R_2$ = alkylene and n > 5, --

UNITED STATES PATENT AND TRADEMARK OFFICE
CERTIFICATE OF CORRECTION

PATENT NO.         : 7,250,217 B2
APPLICATION NO.    : 10/499121
DATED              : July 31, 2007
INVENTOR(S)        : Manfred Hoss et al.

It is certified that error appears in the above-identified patent and that said Letters Patent is hereby corrected as shown below:

Column 10, line 55, reads "(3 $G_g$)," should read -- (3G8), --

Signed and Sealed this

Eleventh Day of December, 2007

JON W. DUDAS
*Director of the United States Patent and Trademark Office*